United States Patent
Rausch et al.

(10) Patent No.: US 12,545,209 B2
(45) Date of Patent: Feb. 10, 2026

(54) METHOD FOR PRODUCING A BELT STRAP, AND A BELT STRAP

(71) Applicant: ZF AUTOMOTIVE GERMANY GMBH, Alfdorf (DE)

(72) Inventors: Martina Rausch, Remshalden (DE); Viktorija Mecnika, Schwabisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 163 days.

(21) Appl. No.: 18/557,061

(22) PCT Filed: Apr. 21, 2022

(86) PCT No.: PCT/EP2022/060556
§ 371 (c)(1),
(2) Date: Oct. 25, 2023

(87) PCT Pub. No.: WO2022/228993
PCT Pub. Date: Nov. 3, 2022

(65) Prior Publication Data
US 2024/0217476 A1  Jul. 4, 2024

(30) Foreign Application Priority Data
Apr. 29, 2021  (DE) .................. 10 2021 110 992.2

(51) Int. Cl.
*B60R 22/12* (2006.01)
*D03D 1/00* (2006.01)
(Continued)

(52) U.S. Cl.
CPC ........... *B60R 22/12* (2013.01); *D03D 1/0005* (2013.01); *D03D 15/283* (2021.01);
(Continued)

(58) Field of Classification Search
CPC .... B60R 22/12; D03D 1/0005; D03D 1/0088; D03D 15/533; D06C 7/00; D10B 2401/18; D10B 2505/122
See application file for complete search history.

(56) References Cited

U.S. PATENT DOCUMENTS 10,526,731 B2 * 1/2020 Podhajny ............. D03D 1/0088
11,535,189 B2 * 12/2022 Wang ...................... B60R 22/12
(Continued)

FOREIGN PATENT DOCUMENTS

DE           29711050 U1     8/1997
DE           10205937 A1     8/2002
(Continued)

OTHER PUBLICATIONS

PCT International Search Report for corresponding International Applicaiton Serial No. PCT/EP2022/060556, mailed Aug. 26, 2022, pp. 1-4.

*Primary Examiner* — Daniel J Rohrhoff
(74) *Attorney, Agent, or Firm* — Tarolli, Sundheim, Covell & Tummino LLP

(57) ABSTRACT

The invention describes a method of manufacturing a webbing (11) for a safety system of an automotive vehicle, wherein, in one method step, a webbing body (12) is woven, wherein at least one electric conductor (16) is woven into the webbing body (12), and wherein, in a further method step, the webbing body (12) is passed through a calender (24), with the webbing body (12) being compressed in the calender (24) by a maximum of 5%. Furthermore, the invention indicates a webbing (11).

7 Claims, 2 Drawing Sheets

(51) Int. Cl.
*D03D 15/283* (2021.01)
*D03D 15/533* (2021.01)
*D06C 7/00* (2006.01)
*D06C 15/02* (2006.01)
*H05B 3/34* (2006.01)

(52) U.S. Cl.
CPC ............ *D03D 15/533* (2021.01); *D06C 7/00* (2013.01); *D06C 15/02* (2013.01); *H05B 3/347* (2013.01); *D10B 2331/04* (2013.01); *D10B 2401/16* (2013.01); *D10B 2401/18* (2013.01); *D10B 2505/122* (2013.01); *H05B 2203/017* (2013.01)

(56) References Cited

U.S. PATENT DOCUMENTS

| | | | | |
|---|---|---|---|---|
| 11,566,351 | B2 * | 1/2023 | Cobanoglu | ............ D03D 15/47 |
| 2009/0050663 | A1 * | 2/2009 | Ecker | .................... D05B 25/00 |
| | | | | 226/49 |
| 2013/0102217 | A1 * | 4/2013 | Jeon | ....................... D03D 15/47 |
| | | | | 442/205 |
| 2013/0193727 | A1 * | 8/2013 | Rodemer | ................. B60R 22/12 |
| | | | | 297/217.3 |
| 2015/0145314 | A1 * | 5/2015 | An | ........................... D02J 1/228 |
| | | | | 428/401 |
| 2017/0341621 | A1 * | 11/2017 | Helvoort | ................. D03D 11/02 |
| 2021/0309179 | A1 * | 10/2021 | Zhang | ....................... B60H 1/00 |
| 2021/0339700 | A1 * | 11/2021 | Rausch | ................. B60R 22/12 |
| 2022/0001831 | A1 * | 1/2022 | Rausch | .................... B32B 5/073 |
| 2022/0316104 | A1 * | 10/2022 | Krauss | .................... D03D 11/00 |
| 2022/0363217 | A1 * | 11/2022 | Seyffert | ................. B60R 22/48 |
| 2024/0200238 | A1 * | 6/2024 | Mecnika | ................. D03D 1/0088 |
| 2024/0208458 | A1 * | 6/2024 | Mecnika | ................. B60R 22/12 |

FOREIGN PATENT DOCUMENTS

| | | | |
|---|---|---|---|
| DE | 102018124239 A1 | 4/2020 | |
| JP | 2015217879 A | 12/2015 | |
| WO | WO-2024223440 A1 * | 10/2024 | ............ B60R 22/12 |

* cited by examiner

METHOD FOR PRODUCING A BELT STRAP, AND A BELT STRAP

RELATED APPLICATIONS

This application is a U.S. National Stage Application filed under 35 USC 371, claiming priority to Serial No. PCT/EP2022/060556, filed on 21 Apr. 2022; which claims priority from German Patent Application DE 10 2021 110 992.2, filed 29 Apr. 2021, the entireties of which are hereby incorporated herein by reference.

TECHNICAL FIELD

The invention relates to a method of manufacturing a webbing for a safety system of an automotive vehicle as well as to a webbing.

BACKGROUND

A safety system comprising a webbing serves to restrain a vehicle occupant when the vehicle strongly decelerates so that the occupant him-/herself decelerates as smoothly as possible and is prevented from contacting objects inside the vehicle such as a steering wheel or an instrument panel.

Apart from the safety aspect, the webbing can also fulfill comfort functions such as a heating function. As an alternative, or in addition, a sensor function may be integrated in the webbing. For this purpose, usually electric conductors are integrated in the webbing.

During manufacture of a webbing, a webbing body is finally guided in a heated state through a calender, with the webbing body being compressed, as a rule, by 10% to 20%. The aim of this process is to smooth the surface of the webbing body and, additionally, to reduce and to adjust, respectively, a thickness of the webbing body.

It is a problem in this case that, when the webbing body is compressed in the calender, electric conductors integrated in the webbing body are heavily loaded, whereby the comfort functions can fail already after a short service life.

SUMMARY

Therefore, it is an object of the present invention to provide a method of manufacturing a webbing as well as a webbing with an integrated comfort function which has a long service life.

According to the invention, this object is achieved by a method of manufacturing a webbing for a safety system of an automotive vehicle comprising the steps of:
  weaving a webbing body, wherein at least one electric conductor is woven into the webbing body,
  passing the webbing body through a calender after thermosetting, wherein the webbing body is compressed in the calender by a maximum of 5%.

Accordingly, the compression relates to the thickness of the webbing body before the latter enters the calender.

The method according to the invention offers the advantage that, when the webbing body is passed through the calender, the webbing is smoothed without high pressure being exerted on the electric conductors inside the webbing body.

By compressing the webbing body by a maximum of 5%, the electric conductor is specifically prevented from being squeezed and/or deformed when the webbing body is passed through the calender. Further, in the case of enamel-insulated conductors the enamel is prevented from being melted or sticking together due to high pressure.

A webbing manufactured in this way has a particularly long service life of the electrically conducting components without the non-electric properties of the webbing being adversely modified. In particular, a webbing body of a webbing manufactured in this way has a higher breaking strength than a more strongly compressed webbing body.

In addition, the scrub resistance of the conductors embedded in the webbing body is improved.

The electric conductors of the webbing body manufactured according to the invention are capable of excellently withstanding bending stresses.

Those stresses occur specifically in the area of a locking tongue through which the webbing is usually passed.

A webbing body manufactured according to the invention can withstand more than 50,000 scrub cycles, for example.

According to an embodiment, the webbing body is not compressed in the calender, that is, the compression is 0%. Hence the method is particularly gentle to the electric conductors integrated in the webbing body.

The webbing body is heated before it enters the calender. This may result in better smoothing of the webbing body.

For example, the webbing body is heated to a temperature ranging from 185° C. to 240° C., specifically to a temperature ranging from 190° C. to 210° C. An increase to said temperature is necessary to adjust the technical parameters of the webbing such as the elongation.

The at least one electric conductor may include plural single wires. This renders the electric conductor particularly flexible. In such electric conductor, the method according to the invention prevents the single wires from being pressed excessively against each other, which may result in damage of the wires.

The electric conductor is, for example, a thermal conductor or a sensor, specifically a temperature sensor. Accordingly, comfort functions such as a heating function can be integrated in the webbing.

Preferably, the electric conductor is woven as a warp thread or as a weft thread into the webbing body. In this way, the electric conductor can be integrated particularly easily in the webbing body already while the latter is manufactured.

Moreover, the object is achieved by a webbing comprising a webbing body and at least one electric conductor woven into the webbing body which was manufactured by a method as described before.

BRIEF DESCRIPTION OF THE DRAWINGS

Further advantages and features of the invention will be evident from the following description and from the attached drawings which are referred to, and wherein.

DESCRIPTION

Figure 1:
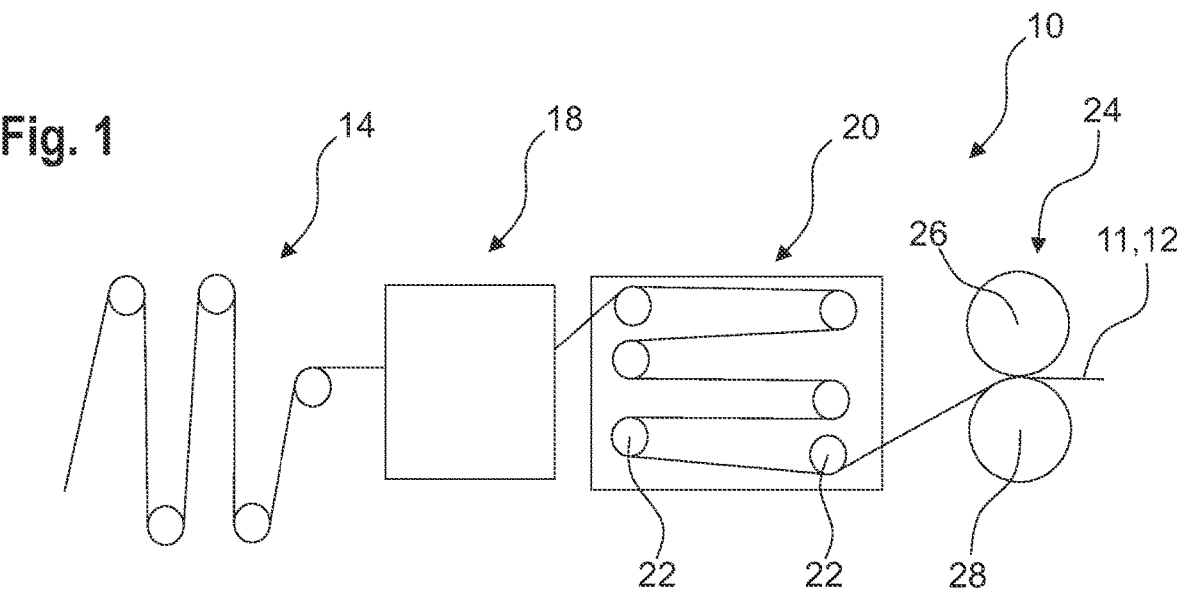
FIG. 1 schematically shows an apparatus for manufacturing a webbing according to the invention, FIG. 2 schematically shows a webbing body of a webbing according to the invention.

FIG. 1 schematically illustrates a device 10 for manufacturing a webbing 11 for a safety system of an automotive vehicle.

Initially, a webbing body 12 is woven in a loom known per se and not shown in detail here and then passes on to a feeding device 14.

The thickness of the webbing body 12 can be influenced by the number of warp threads and the weft threads density. The higher the number of warp threads and the weft thread density, the thicker the webbing body 12 becomes and the higher the breaking strength of the webbing body 12 is.

The weft and warp threads are preferably made of PET.

The thickness of the webbing body 12 after weaving ranges from 1 mm to 2 mm, for example.

Figure 2:
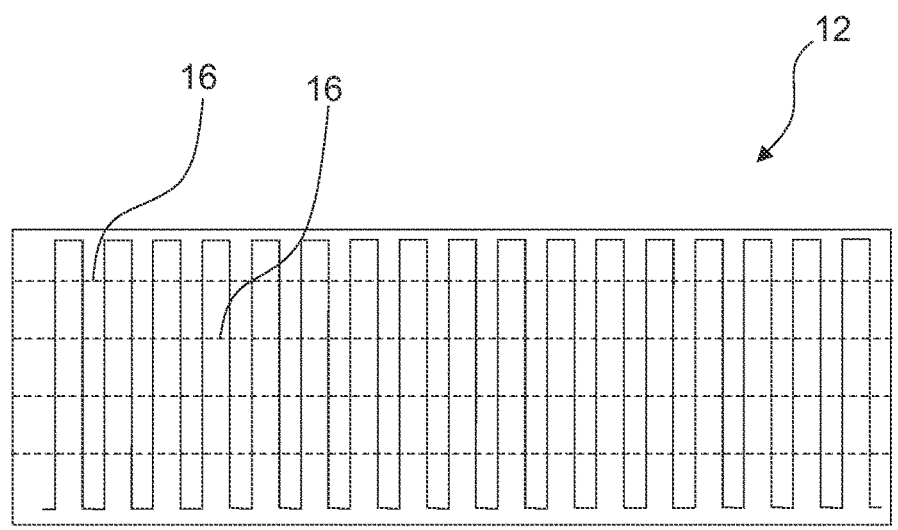

Plural electric conductors 16 are woven into the webbing body 12, as is shown in FIG. 2 illustrating a section of a webbing body 12.

In the embodiment, the electric conductors 16 are woven as warp threads into the webbing body 12.

Alternatively, the electric conductors 16 may be woven as weft threads into webbing body.

For example, the electric conductors 16 are heating conductors or sensors.

Figure 3:
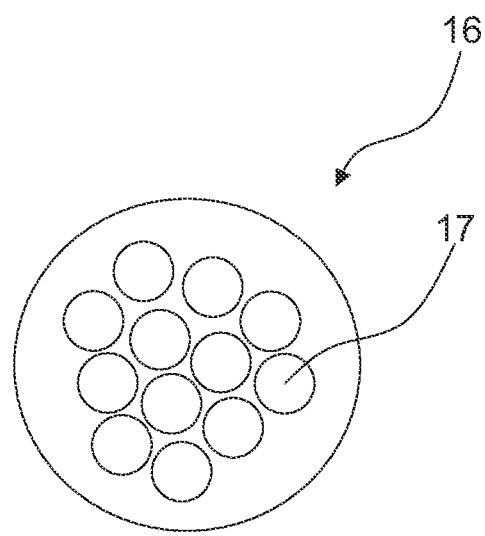
FIG. 3 shows a cross-section of an electric conductor.

FIG. 3 shows a section across an exemplary electric conductor 16. The shown electric conductor 16 has plural single wires 17. However, other types of electric conductors 16 are also conceivable.

After weaving, the webbing body 12 is dyed in a dying device 18. The dying device 18 shall not be discussed in detail here, as this method step is sufficiently known from prior art.

After that, the webbing body 12 enters a fixing device 20 where the webbing body 12 is heated.

The webbing body 12 is specifically heated to 185° C. to 240° C., preferably to 190° C. to 210° C.

Depending on the difference between the entering and the leaving velocity in the fixing unit, the webbing body 12 can be stretched or upset. Accordingly, the elongation of the webbing is adjusted depending on the technical parameters of the yarn used.

Subsequently, the webbing body 12 passes through a calender 24.

The calender 24 comprises two metal rollers 26, 28 between which the webbing body 12 is passed through.

The webbing body 12 is compressed in the calender 24, according to the invention by a maximum of 5%, however, based on its thickness before it enters the calender 24.

It is also conceivable that the webbing body 12 is not compressed at all in the calender 24.

In this way, smoothing of the webbing body 12 is obtained without compressing and/or deforming the electric conductors 16 in the webbing body 12.

The webbing body 12 is usually manufactured as an endless body.

For finishing a webbing 11, the webbing body 12 only has to be cut to length.

The invention claimed is:

1. A method of manufacturing a webbing (11) for a safety system of an automotive vehicle, comprising the steps of:
    weaving a webbing body (12), wherein at least one electric conductor (16) is woven as a warp thread into the webbing body (12),
    passing the webbing body (12) through a calender (24), wherein the webbing body (12) is compressed in the calender (24) by a maximum of 5%.

2. The method according to claim 1, wherein the webbing body (12) is not compressed in the calender (24).

3. The method according to claim 1, wherein the webbing body (12) is heated before it enters the calender (24).

4. The method according to claim 3, wherein the webbing body (12) is heated to a temperature ranging from 185° C. to 240° C.

5. The method according to claim 1, wherein the at least one electric conductor (16) includes plural single wires (17).

6. The method according to claim 1, wherein the electric conductor (16) is a heating conductor or a sensor.

7. A webbing (11) comprising a webbing body (12) and at least one electric conductor (16) woven into the webbing body (12) which was manufactured by a method according to claim 1.

* * * * *